United States Patent Office 3,734,772

Patented May 22, 1973

3,734,772
MAGNETIC RECORDING MEDIA

Georg Schnell and Heinz Stritzinger, Ludwigshafen, Guenter Vaeth, Limburgerhof, Werner Grau, Lampertheim, and Fritz Hammon and Manfred Hopp, Ludwigshafen, Germany, assignors to Badische Anilin- & Soda-Fabrik Aktiengesellschaft, Ludwigshafen (Rhine), Germany No Drawing. Filed Jan. 13, 1971, Ser. No. 106,243
Claims priority, application Germany, Jan. 20, 1970, P 20 02 318.1
Int. Cl. H01f *10/00*
U.S. Cl. 117—235 1 Claim

ABSTRACT OF THE DISCLOSURE

Magnetic recording media in tape form having on the back of the substrate a pattern of raised dots with a high coefficient of friction which improve the winding properties.

The recording media form smooth firm packs even when wound at high speeds, there being no impairment of the electroacoustic properties.

This invention relates to magnetic recording media exhibiting improved winding properties, the back of the flexible substrate having a special surface structure.

When magnetic recording tapes are wound rapidly, it is required that the pack of tape be as flat as possible, i.e. individual layers of tape should not protrude appreciably from the rest of the pack. The main cause of unevenness is that, as the tape is wound, air is trapped between the layers of tape with the result that the tape floats on a cushion of air. The faster the tape is wound, the more air is trapped. In industry as well as in the studio fast winding speeds are absolutely essential. It is not always possible, for operational reasons, to use reels having flanges which prevent layers of tape from completely jumping out of the pack. Even where flanged reels are used, smooth operation is only possible with magnetic tapes which wind entirely satisfactorily because the edges of the tape may otherwise be damaged by coming into contact with the flanges. In order to obtain smooth packs with tapes used in the studio, the back of the substrate is roughened. This is usually effected by applying a coating in a thickness of about 5$\mu$. the coating being filled with pigments and/or dyes. By carefully adjusting the relative proportions of pigment and binder it is possible to achieve a surface roughness of from 0.5 to 10$\mu$ in the dried coating. The statistically distributed irregularities in this layer penetrate the cushion of air and lead to early contact between the tape and the pack, with the result that floating of the tape on a cushion of air as it is wound is substantially avoided and the air can escape at the sides.

However, the pronounced irregularities in the surface of this layer produce deformations in the magnetic tape during storage and these result in loss of contact between the magnetic layer and the recording or reproducing head when the tape is used.

We have now found that the said drawbacks can be avoided, surprisingly, by providing the tape base with a pattern of raised dots having a high coefficient of friction.

Accordingly, the present invention relates to magnetic recording media in tape form exhibiting improved winding properties and having a magnetic layer on a flexible base, wherein the back of the substrate has a pattern of raised dots with a high coefficient of friction.

The pattern of raised dots having a high coefficient of friction may for example be applied to the back of the substrate in a conventional manner, a particularly suitable method being gravure printing using a roll provided with an appropriate pattern. This pattern consists of depressions in the surface of the printing roll, which depressions are filled with the binder or binder mixture. The depressions in the printing rolls may be regular or irregular in shape. Suitable material to be applied to form the raised pattern is any conventional binder such as vinyl chloride and/or vinylidene chloride copolymers, homopolymers and copolymers of acrylates or methacrylates, polyvinylformals, soluble polyamides, in particular copolyamides, polyesters of polyvalent carboxylic acids with polyhydric alcohols, curable epoxy resins or polyurethane resins and polyurethane-forming reactive paints containing isocyanates and isoccyanate-reactive groups, in particular organic compounds bearing hydroxyl groups. Binders of this type are described, for example, in the monograph by Nylen and Sunderland, "Modern Surface Coatings," Interscience Publishers, London, 1965. By carrying out a few simple experiments, the skilled worker will have no difficulty in selecting a suitable binder, the choice of binder being substantially determined by its adhesion to the substrate which may be pretreated and by its hardness after application. It is particularly advantageous to use the binder or binder mixture in admixture with particulate non-magnetizable fillers or pigments, such as titanium dioxide in the form of anatase or rutile, zinc oxide, barium sulfate or non-magnetizable iron oxide. The addition of fine or very fine fillers or pigments may be readily adjusted to give the material used for the pattern of dots the desired properties of exhibiting no tackiness between the pattern and the magnetic coating at the operating temperature (up to about 50° C.) and of having a relatively high coefficient of friction. It is very advantageous for the material used for making the pattern of dots to have a coefficient of friction of more than 0.25, as measured according to German standard specification No. 45,512, Sheet 1, when in contact with the magnetic layer. The surface roughness of the raised dots of the pattern should advantageously be such that the $R_t$ value according to German standard specification No. 4,761 is below 0.5$\mu$. The $R_t$ value is the mean distance between the 10 highest peaks and deepest valleys over a length of 3.7 mm., only irregularities having a length of less than 0.25 mm. being taken into account. Measurement is effected with a stylus having a radius of 5 microns and applied to surface with a force of 30 milligrams.

Conventional materials are suitable for the flexible base of the magnetic recording media of the invention, particularly plastics films in the usual thicknesses of which films of polyesters, such as polyethylene terephthalate, or of polyvinyl chloride are particularly suitable.

The magnetic coating may be prepared using conventional ferromagnetic materials or magnetic pigments such as $\gamma$-iron(III) oxide, ferromagnetic chromium dioxide or the metal alloys of heavy metals such as iron, cobalt and/or nickel, which are known to be suitable for the preparation of magnetic recording media. The binder used in the dispersion of finely divided magnetic pigment may be any of those conventionally used for this purpose, for example any of the binders mentioned above for the preparation of the pattern of dots.

The shape of the dots applied to the magnetic tapes of the invention is advantageously circular, but other regular or irregular shapes, such as squares, rhombi or rectangles, are also suitable.

The height of the dots above the back of the substrate is advantageously between 0.3 and 5$\mu$, in particular between 1.5 and 3.5$\mu$. The dots advantageously have a surface area of from 0.001 to 0.005 mm.$^2$. To avoid the formation of impressions in the magnetic tape, which impressions would increase the noise and, if regular, introduce a spurious signal, and on the other hand to ensure that the gaps between the dots have a sufficiently large cross section to enable air to escape to the sides, it is particularly advantageous to select the shape, position and number of dots per unit of area so that no dot can fit into the spaces between other dots. Especially when the pattern is made up of round or square dots of the same size spaced the same distance apart, this requirement is net by ensuring that the area covered by the dots is larger than the uncovered area.

With the magnetic recording media of the invention it is possible to obtain completely smooth packs without winding aids at speeds of up to 15 m./s. and pack diameters of about 30 cm. Due to the relatively large contact area provided by the large number of dots, smooth firm packs are obtained and, as compared with the previously employed method, head-to-tape contact is not impaired by impressions in the tape, which is manifested by constant low modulation noise and good high-frequency sensitivity before and after the application of the dots. In addition, the good winding properties of the magnetic recording media of the invention are not accompanied by any appreciable increase in the stiffness of the tapes.

The invention is further illustrated by the following examples.

EXAMPLE 1

A mixture of 500 parts by weight of finely divided titanium dioxide, 200 parts by weight of a soluble polyurethane resin, 3 parts by weight of soybean lecithin and 1,200 parts by weight of tetrahydrofuran is dispersed for several hours in a stirred ball mill and filtered through a paper filter. The resulting dispersion is then diluted with tetrahydrofuran to give an efflux time of 40 seconds using a DIN beaker (orifice 4 mm.).

This mixture is applied, by means of a gravure roll having a pattern of circular depressions, to the back of a web of conventional magnetic tape having an overall thickneess of 35$\mu$ and a 12$\mu$ thick magnetic coating containing $\gamma$-iron(III) oxide as magnetic pigment. After drying, the applied dots each have a surface area of about 0.003 mm.$^2$ and a height of about 2$\mu$. The distance separating the dots is smaller than the diameter of the individual dots.

EXAMPLE 2

A mixture of 225 parts by weight of finely divided titanium dioxide, 200 parts by weight of polyvinylformal and 1,800 parts by weight of cyclohexanone is dispersed for 4 hours in a stirred ball mill containing porcelain balls and then filtered through a 16,000 openings/cm.$^2$ sieve. The resulting dispersion is diluted with cyclohexanone to give an efflux time of about 40 seconds using a DIN beaker (orifice 4 mm.).

The mixture thus obtained is then applied, by means of a gravure roll having 60 pyramid-shaped depressions per cm. to the back of a conventional magnetic recording tape of the kind described in Example 1. The applied dots are dried and each dot then covers an area of about 0.005 mm.$^2$ and has a height of about 1.5$\mu$.

The webs of magnetic tape modified as described in Examples 1 and 2 are slit into tapes having a width of 6.25 mm.

These magnetic tapes have much better winding properties than those without the pattern of raised dots on the back of the substrate, whereas the electroacoustic properties of the two types of tapes are virtually the same.

We claim:

1. Magnetic recording media in tape form exhibiting improved winding properties and having a magnetic coating on a flexible substrate, wherein the back of the substrate has a pattern of raised dots with a high coefficient of friction, said dots being composed of a binder in admixture with particulate, non-magnetizable fillers or particulate, non-magnetizable pigments and having a height of from 0.3 to 5$\mu$, said dots further having a surface area of from 0.0001 to 0.0005 mm.$^2$, the distance separating said dots being smaller than the diameter of the individual dots, whereby the area covered by said dots is greater than the uncovered area, said raised dots still further having a surface roughness such that the $R_t$ value is below 0.5$\mu$.

References Cited

UNITED STATES PATENTS

| | | | |
|---|---|---|---|
| 2,782,043 | 2/1957 | Andrews | 352—17 X |
| 3,293,066 | 12/1966 | Haines | 117—237 X |
| 3,476,596 | 11/1969 | Carroll | 117—239 X |
| 3,062,676 | 11/1962 | Newmann et al. | 117—235 X |

WILLIAM D. MARTIN, Primary Examiner

B. D. PIANALTO, Assistant Examiner

U.S. Cl. X.R.

117—4, 240